US009641697B2

(12) United States Patent
Wu et al.

(10) Patent No.: US 9,641,697 B2
(45) Date of Patent: May 2, 2017

(54) POLICY AND CHARGING CONTROL METHOD, V-PCRF AND V-OCS (71) Applicant: ZTE CORPORATION, Shenzhen, Guangdong Province (CN)

(72) Inventors: Zhonghua Wu, Shenzhen (CN); Xiaoyun Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 149 days.

(21) Appl. No.: 14/394,290

(22) PCT Filed: Apr. 9, 2013

(86) PCT No.: PCT/CN2013/073961
§ 371 (c)(1),
(2) Date: Oct. 14, 2014

(87) PCT Pub. No.: WO2013/155942
PCT Pub. Date: Oct. 24, 2013

(65) Prior Publication Data
US 2015/0087262 A1    Mar. 26, 2015

(30) Foreign Application Priority Data
Apr. 18, 2012  (CN) .......................... 2012 1 0116355

(51) Int. Cl.
*H04M 15/00*   (2006.01)
*H04W 4/24*    (2009.01)
(Continued)

(52) U.S. Cl.
CPC .... *H04M 15/8038* (2013.01); *H04L 12/1407* (2013.01); *H04M 15/64* (2013.01);
(Continued)

(58) Field of Classification Search
CPC .. H04M 15/66; H04M 15/64; H04M 15/8038; H04L 67/141; H04L 12/1403; H04L 63/20; H04W 8/20
See application file for complete search history.

(56) References Cited

U.S. PATENT DOCUMENTS

2008/0046963 A1 * 2/2008 Grayson ................. H04L 12/66
                                                          726/1
2009/0264097 A1   10/2009 Cai et al.
2012/0076125 A1 * 3/2012 Kopplin .................. H04W 8/06
                                                         370/338

FOREIGN PATENT DOCUMENTS

CN       1968139 A      5/2007
CN       102014360 A    4/2011
(Continued)

OTHER PUBLICATIONS

Online Charging in the Roaming EPC/LTE Network; Yigang Cai and Xiang Yang Li; XP-001553595.

*Primary Examiner* — Curtis Odom
(74) *Attorney, Agent, or Firm* — Ling Wu; Stephen Yang; Ling and Yang Intellectual Property (57) ABSTRACT

A subscription information processing method, a policy and charging control method, an online charging method, a visited network, a V-PCRF and a V-OCS, wherein, the subscription information processing method comprises: a visited network receiving visited network subscription information and account information of a roaming user, the visited network subscription information and the account information and home network subscription information and account information of the roaming user using the same user identification information; the visited network storing the visited network subscription information and the account information of the roaming user.

8 Claims, 4 Drawing Sheets

(51) Int. Cl.
*H04L 12/14* (2006.01)
*H04W 8/02* (2009.01)
*H04W 8/06* (2009.01)
*H04W 8/08* (2009.01)

(52) U.S. Cl.
CPC ............ *H04M 15/66* (2013.01); *H04W 4/24* (2013.01); *H04W 8/02* (2013.01); *H04W 8/06* (2013.01); *H04W 8/082* (2013.01)

(56) References Cited

FOREIGN PATENT DOCUMENTS

| | | |
|---|---|---|
| CN | 102647699 A | 8/2012 |
| WO | 2011020514 A1 | 2/2011 |
| WO | 2011026385 A1 | 3/2011 |

\* cited by examiner

POLICY AND CHARGING CONTROL METHOD, V-PCRF AND V-OCS

TECHNICAL FIELD

The present invention relates to the communication field, and in particular, to a subscription information processing method, a policy and charging control method, an online charging method, a visited network, a visited network Policy and Charging Rules Function (V-PCRF) and a visited network Online Charging System (V-OCS).

BACKGROUND ART

Local Break Out (LBO) means that the service data used by the user in a roaming state are transmitted to the destination directly through the visited network, without need of being routed back to the home network from the visited network and then transmitted to the destination by the gateway of the home network. The LBO services are directly processed by the visited network, without need of using the routing between the home network and the visited network. In this way, good experience of the user can be ensured, and operation costs can be reduced by saving the bandwidth between networks of different operators.

Figure 1:
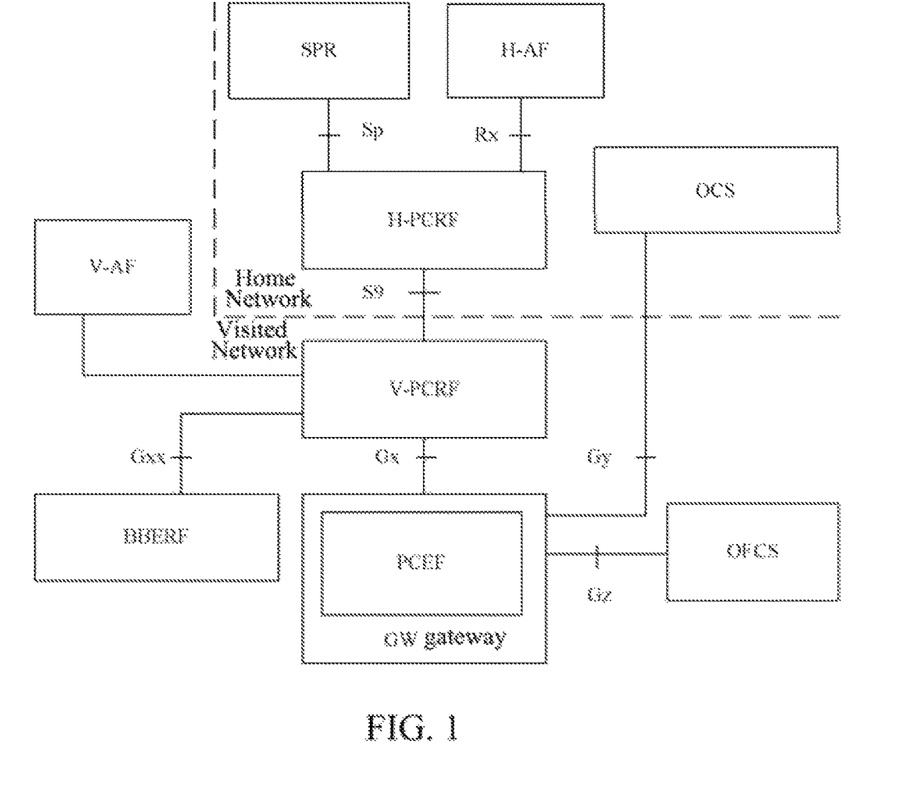
FIG. 1 illustrates the policy and charging control architecture in Local Break Out (LBO) roaming scenario in the related art.

The Policy and Charging Control (PCC) architecture used in the LBO scenario of the Evolved Packet System (EPS) of R8 defined by the current 3rd Generation Partnership Project (3GPP) wireless communication standard organization is as shown in FIG. 1.

An Application Function (AF) provides access points for service applications, and dynamic policy control needs to be performed on the network resources used by these services applications. When the service plane performs parameter negotiation, AF transmits related service information to a Policy and Charging Rules Function (PCRF). If this service information is consistent with the policy of the PCRF, then the PCRF accepts the negotiation; otherwise, the PCRF rejects the negotiation, and meanwhile provides service parameters acceptable to PCRF in the feedback. Subsequently, AF may return these parameters to User Equipments (UE). Wherein, the interface between AF and PCRF is an Rx interface.

A Policy and Charging Rules Function (PCRF) is a core of the PCC (the figure includes a home network PCRF(H-PCRF) and a V-PCRF(V-PCRF)), and is responsible for making policy decision and charging rules. The PCRF provides network control rules based on service data flow, and the network control includes detection of service data flow, Gating Control, Quality of Service (QoS) control and charging rules based on data flow. The PCRF transmits the policy and charging rules made by itself to a Policy and Control Enforcement Function (PCEF) for enforcement, and meanwhile the PCRF also needs to ensure the consistence between these rules and the user's subscription information. The basis for the PCRF mading policy and charging rules includes: obtaining information related with services from the AF; obtaining user policy charging control subscription information from Subscription Profile Repository (SPR); obtaining information of a network related with bearer from PCEF.

Policy and Control Enforcement Function (PCEF) is generally located inside a Gate Way (GW), and performs the policy and charging rules made by PCRF on the bearer plane. PCEF detects the service data flow according to the service data flow filter in the rules transmitted by the PCRF to perform the policy and charging rules made by the PCRF on the service data flow. When a bearer is established, PCEF performs QoS authorization according to the rules transmitted by PCRF, and performs gating control according to the performing of AF. PCEF implements the corresponding service data flow charging operation according to the charging rules transmitted by PCRF. Charging may be online charging, or offline charging. If it is online charging, then PCEF needs to implement credit management together with an Online Charging System (OCS). In the case of offline charging, PCEF and an Offline Charging System (OFCS) interchange related charging information. The interface between the PCEF and PCRF is a Gx interface, the interface with the OCS is a Gy interface, the interface with OFCS is a Gz interface. PCEF is generally located on a gateway of a network, for example, GPRS gateway support node (GGSN) in GPRS and Packet Data Gateway (PDG) in I-WLAN.

The functions of a Bearer Binding and Event Reporting Function (BBERF) include bearer binding, verification of uplink bearer binding and event report. When a UE accesses via an evolved universal terrestrial radio access network (E-UTRAN), and a proxy mobile IPv6 protocol (PMIPv6) is adopted between the serving gateway (S-GW) and Packet Data Network Gateway (P-GW), BBERF is located in the S-GW; when the UE accesses via a trusted non-3GPP access system, the BBERF is located in a trusted non-3GPP access gateway, and when the UE accesses via an un-trusted non-3GPP access system, the BBERF is located in the Evolved Packet Data Gateway (ePDG). In this case, the PCEF does not implement the bearer binding function.

A SPR stores user policy charging control subscription information related with policy control and charging. The interface between the SPR and PCRF is an Sp interface.

OCS, together with PCEF, implements control and management of user credit in the online charging manner.

OFCS, together with PCEF, implements charging operation in the offline charging manner.

In the LBO roaming scenario, the PCEF is located in a Visit Public Land Mobile Network (VPLMN), policy and charging rules are transmitted from the PCRF of the home network (i.e., H-PCRF) to the PCRF of the visited network (i.e., V-PCRF) via an S9 interface, and then are transmitted to the PCEF located in the visited network via a Gx interface, and transmitted to the BBERF located in the visited network via a Gxx interface. The PCEF of the visited network is connected to the OFCS of the visited network, and is connected to the OCS of the home network via a Gy interface.

Figure 2:
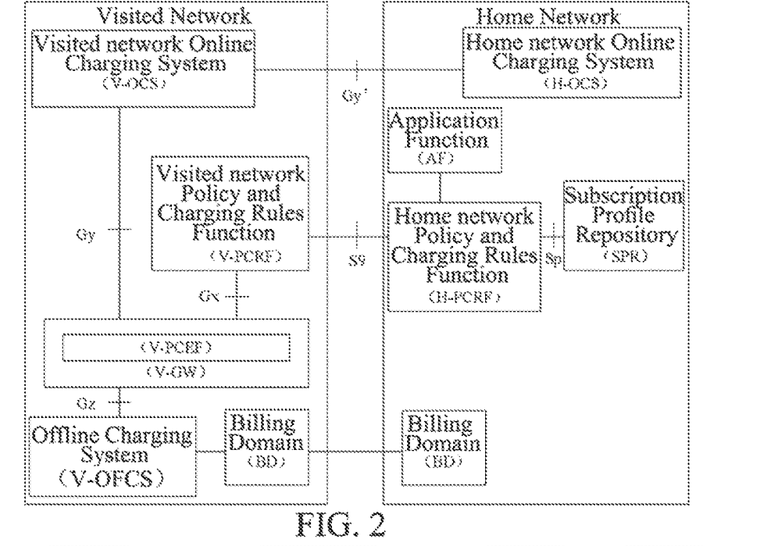
FIG. 2 illustrates the policy and charging control architecture in consideration of OCS interaction in Local Break Out (LBO) roaming scenario in the related art.

With respect to the online charging problem in the LBO roaming scenario, there is still no deep study in the related technologies, and only a basic framework is proposed. As shown in FIG. 2, there is a visited network online charging system (V-OCS) in the visited network responsible for delivering the credit control policy delivered by a home network online charging system (H-OCS) to the PCEF of the visited network. Meanwhile, the online charging information reported by the PCEF is reported to the H-OCS.

It is required in the related technology that the policy and charging rules in the LBO roaming scenario are dominated by the home network PCRF (i.e., H-PCRF), credit management is controlled by the home network OCS (i.e., H-OCS). The user can only subscribe to roaming data services with a home network operator, and the subscription information about the user subscribing to roaming data services can only be stored in the home network. The user cannot further subscribe to roaming data services with a visited network operator using the SIM/USIM card and the Mobile Subscriber International ISDN number (MSISDN) assigned by the home network, wherein ISDN is an Integrated Services Digital Network. The local data services, roaming data services, and circuit domain services subscribed by the user cannot be split or provided by different operators. When quality of service or charging of the roaming data service provided by the home network operator is not competitive, the user may have to endure the roaming data services provided by it because the user still needs other services provided by the home network operator. The LBO roaming scenario made by the related technology cannot give full play to its advantages since policy and charging control and credit management are still dominated by the home network.

SUMMARY OF THE INVENTION

An example of the present invention provides a subscription information processing method, a policy and charging control method, an online charging method, a visited network, a V-PCRF and a V-OCS, in order to solve the problem that when quality of service of the roaming data service or charges provided by the home network operator is not competitive, a user may have to endure the problem of the roaming data services provided by the home network operator because the user still needs other services provided by the home network operator.

An example of the present invention provides a subscription information processing method, comprising:

a visited network receiving visited network subscription information and account information of a roaming user, the visited network subscription information and the account information and home network subscription information and account information of the roaming user using the same user identification information;

the visited network storing the visited network subscription information and the account information of the roaming user.

Preferably, the visited network subscription information of the roaming user contains Local Break Out (LBO) roaming data services subscribed by the user with a visited network operator, the visited network account information of the roaming user contains balance information for performing visited network credit authorization for an IP-Connectivity Access Network (IP-CAN) session of the roaming user; and/or the user identification information comprises a user identifier and/or a user number, the user identifier comprises an International Mobile Subscriber Identity (IMSI), and the user number comprises a Mobile Subscriber International Integrated Services Digital Network number (MSISDN); and the user identification information is assigned by the home network.

An example of the present invention further provides a policy and charging control method, applied in a Local Break Out (LBO) roaming scenario, comprising:

a visited network Policy and Charging Rules Function (V-PCRF) receiving an IP-Connectivity Access Network (IP-CAN) session establishment instruction message transmitted by a gateway of a visited network;

when the V-PCRF determines according to the IP-CAN session establishment instruction message that a policy decision is made for an IP-CAN session of a roaming user through visited network subscription, obtaining visited network subscription information of the roaming user from a visited network Subscription Profile Repository (V-SPR), and generating policy and charging control (PCC) rules according to the visited network subscription information;

the V-PCRF sending the PCC rules to the gateway of the visited network.

Preferably, the step of the V-PCRF determining according to the IP-CAN session establishment instruction message that a policy decision is made for an IP-CAN session of the roaming user through visited network subscription comprises:

the V-PCRF determining according to an access point name of a packet data network identifier contained in the IP-CAN session establishment instruction message that a policy decision is made for an IP-CAN session of the roaming user through visited network subscription.

Preferably, the step of the V-PCRF obtaining visited network subscription information of the roaming user from the V-SPR comprises:

the V-PCRF sending to the V-SPR a subscription data request, and receiving the visited network subscription information obtained by the V-SPR according to the subscription data request.

Preferably, after the step of the V-PCRF determining according to the IP-CAN session establishment instruction message that a policy decision is made for an IP-CAN session of the roaming user through visited network subscription, the method further comprises:

the V-PCRF sending to the V-SPR a subscription update event notification;

after the step of the V-PCRF obtaining visited network subscription information of the roaming user from the V-SPR, the method further comprises:

the V-PCRF receiving latest visited network subscription information of the roaming user transmitted by the V-SPR;

when the V-PCRF finds that it is needed to update PCC rules during a process of visited network policy re-decision, sending latest PCC rules to the gateway of the visited network.

Preferably, user identification information used by the visited network subscription information of the roaming user stored in the V-SPR is the same with user identification information used by the home network subscription information of the roaming user, and the user identification information is assigned by the home network; the user identification information comprises a user identifier and/or a user number, the user identifier comprises an International Mobile Subscriber Identity (IMSI), and the user number comprises a Mobile Subscriber International Integrated Services Digital Network number (MSISDN).

An example of the present invention provides an online charging method, applied in a Local Break Out (LBO) roaming scenario, comprising:

a visited network Online Charging System (V-OCS) receiving a credit control request message transmitted by a gateway of a visited network;

when the V-OCS determines according to the credit control request message that visited network credit control is directly performed for an IP-Connectivity Access Network (IP-CAN) session of a roaming user, obtaining visited network subscription information and associated account information of the roaming user from a V-OCS local database or an external database located in the visited network, and directly generating a visited network credit control policy according to the visited network subscription information and associated account information;

the V-OCS sending the visited network credit control policy to the gateway of the visited network.

Preferably, the step of the V-OCS determining according to the credit control request message that visited network credit control is directly performed for an IP-CAN session of the roaming user comprises:

the V-OCS determining according to an access point name of a packet data network identifier contained in the credit control request message that visited network credit control is directly performed for an IP-CAN session of the roaming user.

Preferably, user identification information used by the visited network subscription information of the roaming user obtained by the V-OCS from the local database or the external database located in the visited network is the same with user identification information used by the home network subscription information of the roaming user, and the user identification information is assigned by the home network; the user identification information comprises a user identifier and/or a user number, the user identifier comprises an International Mobile Subscriber Identity (IMSI), and the user number comprises a Mobile Subscriber International Integrated Services Digital Network number (MSISDN); and/or the account information of the roaming user contains balance information for performing visited network credit authorization for an IP-CAN session of the roaming user.

An example of the present invention further provides a visited network, comprising:

a receiving module, configured to receive visited network subscription information and account information of a roaming user, wherein the visited network subscription information and the account information and home network subscription information and account information of the roaming user use the same user identification information;

a storing module, configured to store the visited network subscription information and the account information of the roaming user.

Preferably, the visited network subscription information of the roaming user contains Local Break Out (LBO) roaming data services subscribed by the user with a visited network operator, the visited network account information of the roaming user contains balance information for performing visited network credit authorization for an IP-Connectivity Access Network (IP-CAN) session of the roaming user; and/or the user identification information comprises a user identifier and/or a user number, the user identifier comprises an International Mobile Subscriber Identity (IMSI), and the user number comprises a Mobile Subscriber International Integrated Services Digital Network number (MSISDN); and the user identification information is assigned by the home network.

An example of the present invention further provides a visited network Policy and Charging Rules Function (V-PCRF), applied in a Local Break Out (LBO) roaming scenario, comprising:

a receiving module, configured to receive an IP-Connectivity Access Network (IP-CAN) session establishment instruction message transmitted by a gateway of a visited network;

a processing module, configured to, when determining according to the IP-CAN session establishment instruction message that a policy decision is made for an IP-CAN session of a roaming user through visited network subscription, obtain visited network subscription information of the roaming user from a visited network Subscription Profile Repository (V-SPR), and generate policy and charging control (PCC) rules according to the visited network subscription information;

a sending module, configured to send the PCC rules to the gateway of the visited network.

Preferably, the processing module is configured to determine according to an access point name of a packet data network identifier contained in the IP-CAN session establishment instruction message that a policy decision is made for an IP-CAN session of the roaming user through visited network subscription.

Preferably, the processing module is configured to send to the V-SPR a subscription data request, and receive the visited network subscription information obtained by the V-SPR according to the subscription data request.

Preferably, the sending module is configured to, after determining according to the IP-CAN session establishment instruction message that a policy decision is made for an IP-CAN session of the roaming user through visited network subscription, send to the V-SPR a subscription update event notification.

The processing module is further configured to: receive latest visited network subscription information of the roaming user transmitted by the V-SPR; and, when finding that it is needed to update PCC rules during a process of visited network policy re-decision, send latest PCC rules to the gateway of the visited network.

Preferably, user identification information used by the visited network subscription information of the roaming user stored in the V-SPR is the same with user identification information used by home network subscription information of the roaming user, and the user identification information is assigned by a home network; the user identification information comprises a user identifier and/or a user number, the user identifier comprises an International Mobile Subscriber Identity (IMSI), and the user number comprises a Mobile Subscriber International Integrated Services Digital Network number (MSISDN).

An example of the present invention further provides a visited network Online Charging System (V-OCS), applied in a Local Break Out (LBO) roaming scenario, comprising:

a receiving module, configured to receive a credit control request message transmitted by a gateway of a visited network;

a processing module, configured to make a visited network credit decision according to the credit control request message, and generate a visited network credit control decision;

a sending module, configured to send to the gateway of the visited network the visited network credit control decision;

a subscription and account balance management module, configured to locally store and manage visited network subscription information of a roaming user and visited network account information of the roaming user for the V-OCS; or used for the V-OCS to obtain from an external database located in the visited network or update the visited network subscription information and the visited network account information; wherein the visited network account information of the roaming user contains balance information used for visited network credit authorization.

Preferably, the processing module is configured to determine according to an access point name of a packet data network identifier contained in the credit control request message that a policy decision is made for an IP-CAN session of the roaming user through visited network subscription, obtain the visited network subscription information and associated account information of the roaming user from the subscription and account balance management module, perform pricing, balance check and credit authorization for each charging key currently activated in the credit control request message according to the visited network subscription information and associated account information of the roaming user, and generate a visited network credit control decision.

The above subscription information processing method, policy and charging control method, online charging method, visited network, V-PCRF and V-OCS enable a user to subscribe to roaming data services with the visited network operator using the user identification information assigned by the home network operator, and the visited network can independently perform policy and charging control and online charging for Local Break Out (LBO) roaming access users.

PREFERRED EMBODIMENTS OF THE INVENTION

The examples of the present invention will be described in detail hereinafter with reference to the drawings. It should be pointed out that the examples and features in the examples of the present application can be freely combined without conflict.

An example of the present invention provides a subscription processing method. Description will be made from the view of the visited network. The method comprises:

In Step 11, a visited network receives visited network subscription information and account information of a roaming user, the visited network subscription information and the account information and home network subscription information and account information of the roaming user use the same user identification information;

wherein, the visited network subscription information of the roaming user contains Local Break Out (LBO) roaming data services subscribed by the user with a visited network operator, the visited network account information of the roaming user contains balance information for performing visited network credit authorization for an IP-Connectivity Access Network (IP-CAN) session of the roaming user; and/or, the user identification information comprises a user identifier and/or a user number, the user identifier comprises an International Mobile Subscriber Identity (IMSI), and the user number comprises a Mobile Subscriber International Integrated Services Digital Network number (MSISDN); and the user identification information is assigned by a home network.

In Step 12, the visited network stores the visited network subscription information and the account information of the roaming user.

The visited network may store the subscription information and the account information of the roaming user in a V-SPR, V-OCS or other network elements of the visited network. The subscription information and the account information may be stored separately or collectively.

The above subscription information processing method enables a user to subscribe to roaming services across operators without need of changing card or number.

An example of the present invention further provides a policy and charging method, applied in a Local Break Out (LBO) roaming scenario. Description will be made from the view of the V-PCRF in the example. The method comprises:

In Step 21, a visited network Policy and Charging Rules Function (V-PCRF) receives an IP-Connectivity Access Network (IP-CAN) session establishment instruction message transmitted by a gateway of a visited network;

In Step 22, if the V-PCRF determines according to the IP-CAN session establishment instruction message that a policy decision is made for an IP-CAN session of a roaming user through visited network subscription, it obtains visited network subscription information of the roaming user from a visited network Subscription Profile Repository (V-SPR), and generates policy and charging control (PCC) rules according to the visited network subscription information;

In this step, the V-PCRF may determine that a policy decision is made for an IP-CAN session of the roaming user through visited network subscription according to an access point name of a packet data network identifier contained in the IP-CAN session establishment instruction message.

The step of the V-PCRF obtaining visited network subscription information of the roaming user from the V-SPR comprises:

the V-PCRF sending to the V-SPR a subscription data request, and receiving the visited network subscription information obtained by the V-SPR according to the subscription data request.

In addition, after the step of the V-PCRF determining according to the IP-CAN session establishment instruction message that a policy decision is made for an IP-CAN session of the roaming user through visited network subscription, the method further comprises: the V-PCRF sending to the V-SPR a subscription update event notification;

After the step of the V-PCRF obtaining visited network subscription information of the roaming user from the V-SPR, the method further comprises: the V-PCRF receiving latest visited network subscription information of the roaming user transmitted by the V-SPR; if the V-PCRF finds that it is needed to update PCC rules during a process of visited network policy re-decision, sending latest PCC rules to the gateway of the visited network.

Preferably, user identification information used by the visited network subscription information of the roaming user stored in the V-SPR is the same with user identification information used by home network subscription information of the roaming user, and the user identification information is assigned by a home network; the user identification information comprises a user identifier and/or a user number, the user identifier comprises an International Mobile Subscriber Identity (IMSI), and the user number comprises a Mobile Subscriber International Integrated Services Digital Network number (MSISDN).

Step 23, the V-PCRF sends the PCC rules to the gateway of the visited network.

The above policy and charging control method enables a V-PCRF to perform visited network policy and charging control independently.

In addition, an example of the present invention further provides an online charging method, applied in a Local Break Out (LBO) roaming scenario. Description will be made from the view of the V-OCS in the example. The method comprises:

In Step 31, a visited network Online Charging System (V-OCS) receives a credit control request message transmitted by a gateway of a visited network;

In Step 32, if the V-OCS determines according to the credit control request message that visited network credit control is directly performed for an IP-Connectivity Access Network (IP-CAN) session of a roaming user, it obtains visited network subscription information and associated account information of the roaming user from a V-OCS local database or an external database located in the visited network, and directly generates a visited network credit control policy according to the visited network subscription information and associated account information;

wherein, the V-OCS determines, according to the access point name of a packet data network identifier contained in the credit control request message, that visited network credit control is directly performed for the session of a roaming user or the credit control is requested from the H-OCS. When it is determined that visited network credit control is directly performed, the V-OCS obtains visited network subscription information and associated account information of the roaming user, performs pricing, balance check and credit authorization for each charging key currently activated in the credit control request message according to the visited network subscription information and associated account information of the roaming user, and generates a visited network credit control decision, and updates the account balance information of the roaming user after credit authorization succeeds by subtracting authorized credit from the account balance information.

Preferably, user identification information used by the visited network subscription information of the roaming user obtained by the V-OCS from the local database or the external database located in the visited network is the same with user identification information used by home network subscription information of the roaming user, and the user identification information is assigned by a home network; the user identification information comprises a user identifier and/or a user number, the user identifier comprises an International Mobile Subscriber Identity (IMSI), and the user number comprises a Mobile Subscriber International Integrated Services Digital Network number (MSISDN); and/or the visited network account information of the roaming user contains balance information for performing visited network credit authorization for an IP-CAN session of the roaming user.

Step 33, the V-OCS sends the visited network credit control policy to the gateway of the visited network.

It should be pointed out that the above credit control of V-OCS may exist independently from policy and charging control of the PCRF.

The above online charging method enables the V-OCS to perform visited network credit control independently.

The technical scheme of the present invention will be described below from the view of interaction between V-PCRF and V-OCS.

Example One

Figure 3:
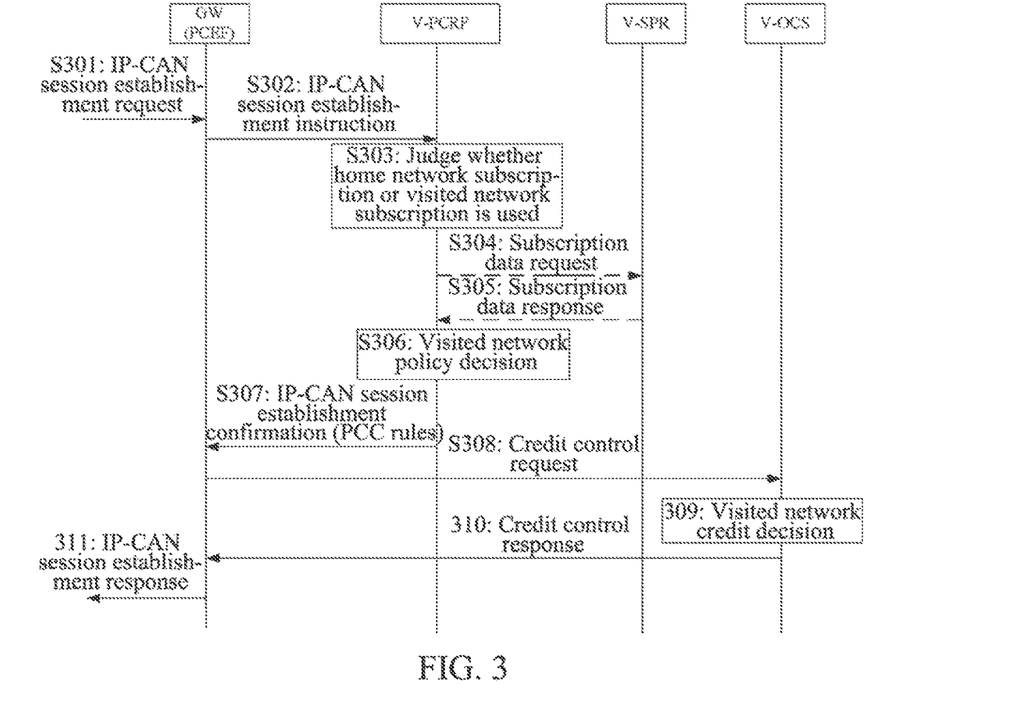
FIG. 3 is a signaling flowchart of an example of the IP-CAN session establishment process according to the present invention.

This example describes that during the process of establishing an IP-CAN session, V-PCRF and V-OCS may directly perform visited network policy control and online charging on the IP-CAN session according to the data services subscribed by the roaming user with the VPLMN operator. This process comprises the following steps:

In S301, the gateway GW/PCEF located in the visited network receives an IP-CAN session establishment request message sent by the UE, and the gateway receives this request message and assigns an IP address for the UE;

In S302, a GW/PCEF sends to the visited PCRF(V-PCRF) an IP-CAN session establishment instruction message, carrying a user identifier IMSI, a user number MSISDN, a Network Access Identifier (NAI), and a Packet Data Network (PDN) identifier Access Point Name (APN);

In S303, V-PCRF judges according to IMSI or MSISDN or NAI that the user is a roaming user, and V-PCRF pre-sets whether home network subscription or visited network subscription is used for policy decision for the IP-CAN session access under each APN; if the current user is a roaming user and its accessed APN is configured to use home network subscription for policy decision, then V-PCRF sends to H-PCRF an IP-CAN session establishment instruction message, and determines the PCC rules finally delivered to the V-PCEF according to the PCC rules returned by the H-PCRF and the local policy of the V-PCRF. If this APN is configured to use local subscription to perform policy decision, then it is to directly turn to the following steps;

In S304, if the V-PCRF does not have related user subscription information locally, then it sends a subscription data request to the V-SPR to obtain, and meanwhile subscribes to a subscription update event notification with V-SPR when the user is online;

In S305, if the V-SPR has the subscription information of the user, the subscription information of the user is contained in a confirmation message returned to the V-PCRF, otherwise it is indicated in the returned confirmation message that the user is unknown;

In S306, the V-PCRF performs authorization and policy decision, makes PCC rules and decides to perform online charging on the IP-CAN according to the user visited network subscription, visited network policy and bearer property, etc. Wherein, PCC rules comprise Charging Key, optionally further comprises Service Identifier, Charging Method (herein online charging) and Metering Method (for example traffic, duration, event and traffic/duration combination);

In S307, the V-PCRF sends to the V-PCEF an IP-CAN session establishment confirmation message, carrying PCC rules and an OCS identifier of the visited network supporting online charging, for example, a certain master OCS address and standby OCS address information of the visited network, the specific definition manner will not be defined here;

In S308, since online charging is adopted, and at least one PCC rule is activated, GW/PCEF sends to V-OCS a credit control request message to request for credit for each Charging Key of activated PCC rules, the message carries the user identifier IMSI, the user number MSISDN, the Network Access Identifier (NAI), the Packet Data Network (PDN), the Access Point Name (APN) and the Charging-Key;

In S309, the V-OCS judges according to the IMSI or MSISDN or NAI in the credit control request message that the user is a roaming user, and the V-OCS pre-sets whether visited network credit control is directly performed for the IP-CAN session under each APN or home network credit control is requested from the H-OCS; if the current user is a roaming user and its accessed APN is configured to request the H-OCS for home network credit control, then the V-OCS forwards the credit control request message to the H-OCS, and determines the credit control decision finally delivered to the V-OCS according to the credit control decision returned by the H-OCS. If this APN is configured as that visited network credit control is directly performed, it is to directly turn to the following steps:

The V-OCS performs Credit authorization for each requested Charging Key according to the network policy. If V-OCS finds that the user's Credit has been exhausted, it will reject authorization. In addition, the V-OCS will subscribe to Credit Re-authorization Triggers and Termination Action when the Final Granted Unit has been exhausted for each requested Charging Key according to network policy.

In S310, the V-OCS returns to the GW/PCEF a credit control response message, carrying the credit control decision;

In S311, the GW/PCEF returns an IP-CAN session establishment response message, the PCEF executes the received credit control decision. If the Credit authorized in the credit control decision has been exhausted, the PCEF initiates a credit control request message to request for Credit; when the conditions for the Credit Re-authorization Triggers subscribed in the credit control decision are met, the PCEF initiates a credit control request message to request for Credit; when no new Credit is authorized, the PCEF will execute the termination action.

Example Two

Figure 4:
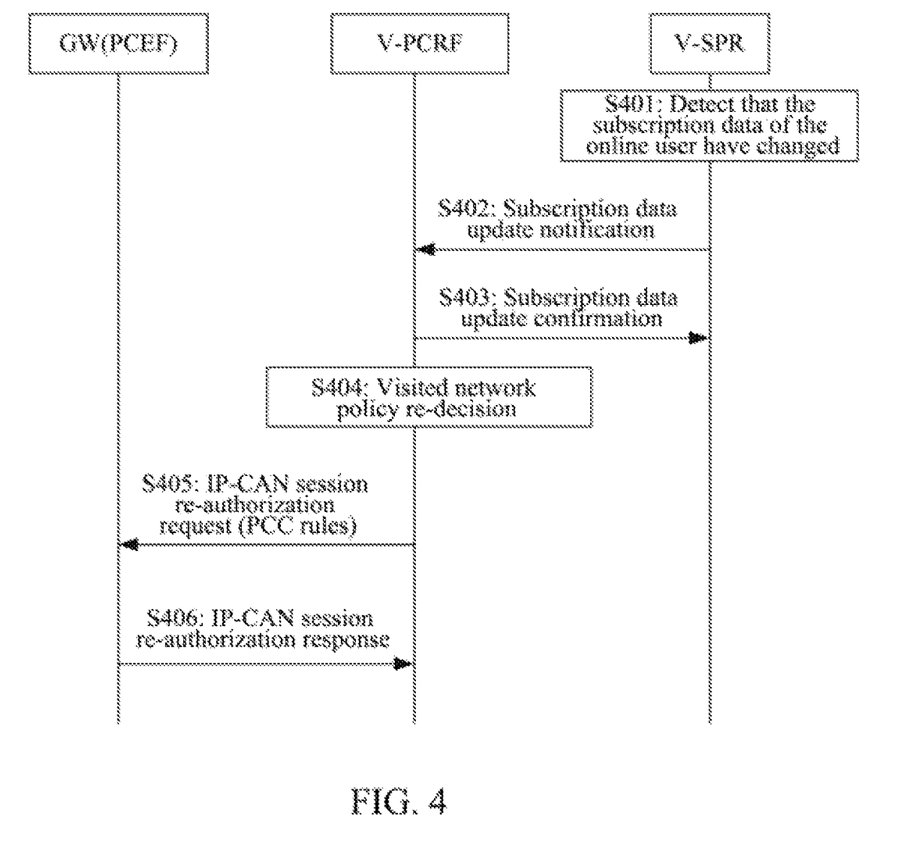
FIG. 4 is a signaling flowchart of an example of policy and charging rules re-decision due to subscription change of the visited network according to the present invention.

This example describes when the visited network subscription of the user changes during the IP-CAN session maintaining process, the V-SPR notifies the V-PCRF to make a policy decision again. This process comprises the following steps:

In S401, during the IP-CAN session maintaining process, if the V-SPR detects that the visited network subscription of the online user has changed, and in step S303, the V-PCRF has subscribed to online user subscription update event notification with the V-SPR, then the V-SPR decides to send a user subscription update notification to the V-PCRF;

In S402, the V-SPR sends to the V-PCRF the user subscription update notification, containing the latest visited network subscription information of the user;

In S403, the V-PCRF returns to the SPR a subscription update notification conformation;

In S404, the V-PCRF makes a visited network policy re-decision;

In S405, if it is found in V-PCRF re-decision that it is needed to update PCC rules, the V-PCRF sends to V-PCEF an IP-CAN session re-authorization request, carrying the latest PCC rules;

In S406, the V-PCEF installs the latest PCC rules, and returns an IP-CAN session re-authorization response to the V-PCRF.

Figure 5:
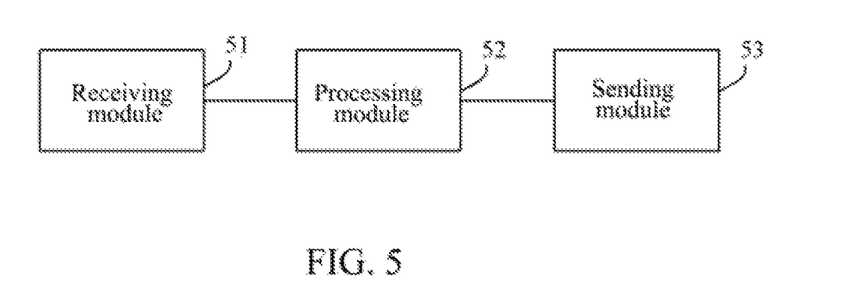
FIG. 5 illustrates the structure of an example of a V-PCRF according to the present invention.

As shown in FIG. 5, it illustrates the structure of an example of the V-PCRF according to the present invention, which is applied in a LBO roaming scenario. The V-PCRF comprises a receiving module 51, a processing module 52 and a sending module 53, wherein:

the receiving module 51 is configured to receive an IP-Connectivity Access Network (IP-CAN) session establishment instruction message transmitted by a gateway of a visited network;

the processing module 52 is configured to determine according to the IP-CAN session establishment instruction message that a policy decision is made for an IP-CAN session of a roaming user through visited network subscription, obtain visited network subscription information of the roaming user from a visited network Subscription Profile Repository (V-SPR), and generate policy and charging control (PCC) rules according to the visited network subscription information;

the sending module 53 is configured to send the PCC rules to the gateway of the visited network.

Wherein, the processing module 52 is configured to determine that a policy decision is made for an IP-CAN session of the roaming user through visited network subscription according to an access point name of a packet data network identifier contained in the IP-CAN session establishment instruction message; or specifically, it is specifically used to send to the V-SPR a subscription data request, and receive the visited network subscription information obtained by the V-SPR according to the subscription data request.

In addition, the sending module 53 is further configured to: send to the V-SPR a subscription update event notification after determining that a policy decision is made for an IP-CAN session of the roaming user through visited network subscription according to the IP-CAN session establishment instruction message; the processing module is further used to: receive latest visited network subscription information of the roaming user transmitted by the V-SPR; and if finding that it is needed to update PCC rules during a process of visited network policy re-decision, send latest PCC rules to the gateway of the visited network.

Preferably, user identification information used by the visited network subscription information of the roaming user stored in the V-SPR is the same with user identification information used by home network subscription information of the roaming user, and the user identification information is assigned by a home network; the user identification information comprises a user identifier and/or a user number, the user identifier comprises an International Mobile Subscriber Identity (IMSI), and the user number comprises a Mobile Subscriber International Integrated Services Digital Network number (MSISDN).

The above V-PCRF does not need to request the H-PCRF for PCC rules and directly deliver or deliver to the gateway of the visited network after modification the PCC rules, instead, it obtains visited network subscription information of the roaming user from the V-SPR, and generates PCC rules and deliver them to the gateway of the visited network, thereby enabling the visited network to perform policy and charging control for the roaming user and the data services subscribed in the local network.

Figure 6:
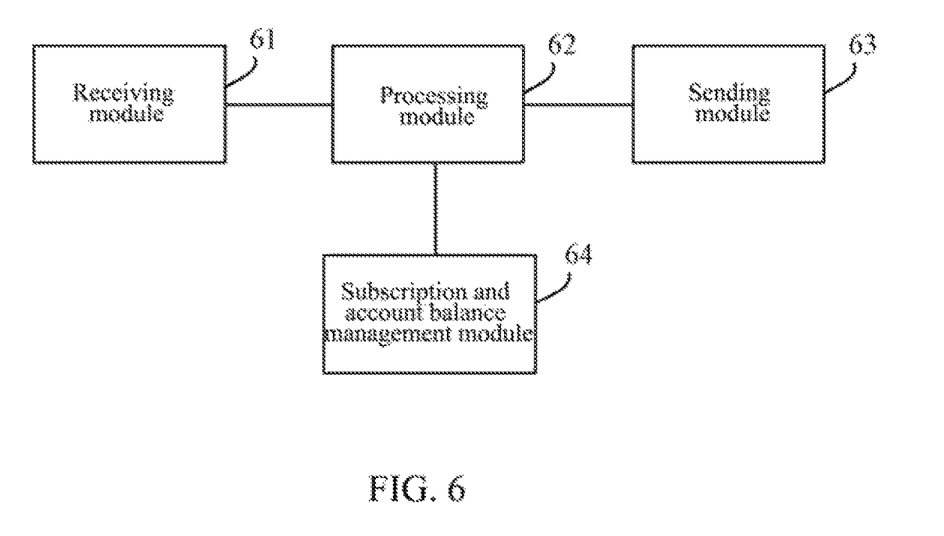
FIG. 6 illustrates the structure of an example of a V-OCS according to the present invention.

As shown in FIG. 6, it illustrates the structure of an example of the V-OCS according to the present invention, which is applied in a LBO roaming scenario. The V-OCS comprises a receiving module 61, a processing module 62, a sending module 63 and a subscription and account balance management module 64, wherein:

the receiving module 61 is configured to receive a credit control request message transmitted by a gateway of a visited network;

the processing module 62 is configured to make a visited network credit decision according to the credit control request message, and generate a visited network credit control decision;

the sending module 63 is configured to send to the gateway of the visited network the visited network credit control decision;

the subscription and account balance management module 64 is configured to locally store and manage the visited network subscription information and visited network account information of a roaming user for the V-OCS; or is used for the V-OCS to obtain from an external database located in the visited network or update the visited network subscription information and the visited network account information; the visited network account information of the roaming user contains balance information used for visited network credit authorization.

Wherein, the processing module 62 is configured to: determine that a policy decision is made for an IP-CAN session of the roaming user through visited network subscription according to an access point name of a packet data network identifier contained in the credit control request message, obtain the visited network subscription information and associated account information of the roaming user from the subscription and account balance management module, perform pricing, balance check and credit authorization for each charging key currently activated in the credit control request message according to the visited network subscription information and associated account information of the roaming user, generate a visited network credit control decision, and request the account balance management module to subtract the authorized credit after credit authorization succeeds and updates the account balance information of the roaming user.

The above V-OCS does not need to request the H-OCS for credit control decision and deliver it to the gateway of the visited network, instead, it delivers the credit control decision generated by itself to the gateway of the visited network, thereby enabling the visited network to independently perform online charging for the roaming user and the data services subscribed in the local network.

Figure 7:
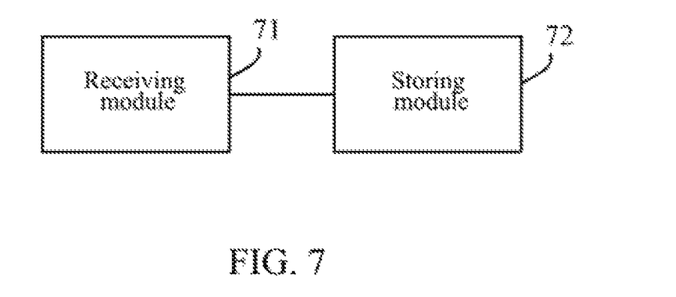
FIG. 7 illustrates the structure of an example of a visited network according to the present invention.

Corresponding to the subscription information processing method, an example of the present invention further provides a visited network. As shown in FIG. 7, the network comprises: a receiving module 71 and a storing module 72, wherein:

the receiving module 71 is configured to receive visited network subscription information and account information of a roaming user, the visited network subscription information and the account information and home network subscription information and account information of the roaming user use the same user identification information;

the storing module 72 is configured to store the visited network subscription information and the account information of the roaming user.

Wherein, the receiving module and the storing module may be located in a V-SPR, V-OCS or other network elements of the visited network. The visited network subscription information and the account information may be stored separately or collectively.

The visited network subscription information of the roaming user contains LBO roaming data services subscribed by the roaming user with the visited network operator.

The visited network account information of the roaming user contains balance information for performing visited network credit authorization for an IP-Connectivity Access Network (IP-CAN) session of the roaming user.

In addition, the user identification information comprises a user identifier and/or a user number, the user identifier comprises an International Mobile Subscriber Identity (IMSI), and the user number comprises a Mobile Subscriber International Integrated Services Digital Network number (MSISDN); and the user identification information is assigned by a home network.

The visited network enables the user to buy roaming services across operators without need of changing card or number.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The present invention is not limited to any particular form of combination of hardware and software.

The above examples are only used to explain, not limit, the technical solutions of the present invention, and the present invention is described in detail only with reference to preferred examples. A person having ordinary skill in the art should appreciate that modifications or equivalent substitutions may be made to the technical solutions of the present invention without departing from the spirit and scope of the present invention. Any modification or equivalent substitutions should be within the protection scope of the claims of the present invention.

INDUSTRIAL APPLICABILITY

The examples of the present invention enable a user to subscribe to roaming data services with the visited network operator using the user identification information assigned by the home network operator, and the visited network can independently perform policy and charging control and online charging for Local Break Out (LBO) roaming access users.

What is claimed is:

1. A policy and charging control method, applied in a Local Break Out (LBO) roaming scenario, comprising:
a visited network Policy and Charging Rules Function (V-PCRF) receiving an IP-Connectivity Access Network (IP-CAN) session establishment instruction message transmitted by a gateway of a visited network;
when the V-PCRF determines according to the IP-CAN session establishment instruction message that a policy decision is made for an IP-CAN session of a roaming user through visited network subscription, the V-PCRF obtaining visited network subscription information of the roaming user from a visited network Subscription Profile Repository (V-SPR), and generating policy and charging control (PCC) rules according to the visited network subscription information; wherein the V-SPR is a Subscription Profile Repository (SPR) located in the visited network;
the V-PCRF sending the PCC rules to the gateway of the visited network;
wherein after the V-PCRF determines according to the IP-CAN session establishment instruction message that a policy decision is made for an IP-CAN session of the roaming user through visited network subscription, the method further comprises:
the V-PCRF sending to the V-SPR a subscription update event notification;

wherein after the V-PCRF obtains visited network subscription information of the roaming user from the V-SPR, the method further comprises:

the V-PCRF receiving latest visited network subscription information of the roaming user transmitted by the V-SPR, when the V-PCRF finds that it is needed to update PCC rules during a process of visited network policy re-decision, sending latest PCC rules to the gateway of the visited network.

2. The method according to claim 1, wherein, that the V-PCRF determines according to the IP-CAN session establishment instruction message that a policy decision is made for an IP-CAN session of a roaming user through visited network subscription, comprises:

the V-PCRF determining according to an access point name of a packet data network identifier contained in the IP-CAN session establishment instruction message that a policy decision is made for an IP-CAN session of the roaming user through visited network subscription.

3. The method according to claim 1, wherein, the V-PCRF obtaining visited network subscription information of the roaming user from the V-SPR, comprises:

the V-PCRF sending to the V-SPR a subscription data request, and receiving the visited network subscription information obtained by the V-SPR according to the subscription data request.

4. The method according to claim 1, wherein, user identification information used by the visited network subscription information of the roaming user stored in the V-SPR is the same with identification information used by home network subscription information of the roaming user, and the user identification information is assigned by a home network; the user identification information comprises a user identifier and/or a user number, the user identifier comprises an International Mobile Subscriber Identity (IMSI), and the user number comprises a Mobile Subscriber International Integrated Services Digital Network number (MSISDN).

5. A visited network Policy and Charging Rules Function (V-PCRF), applied in a Local Break Out (LBO) roaming scenario, comprising hardware performing instructions stored in a non-transitory computer readable medium which executes steps in following modules:

a receiving module, configured to receive an IP-Connectivity Access Network (IP-CAN) session establishment instruction message transmitted by a gateway of a visited network;

a processing module, configured to, when determining according to the IP-CAN session establishment instruction message that a policy decision is made for an IP-CAN session of a roaming user through visited network subscription, obtain visited network subscription information of the roaming user from a visited network Subscription Profile Repository (V-SPR), and generate policy and charging control (PCC) rules according to the visited network subscription information; wherein the V-SPR is a Subscription Profile Repository (SPR) located in the visited network;

a sending module, configured to send the PCC rules to the gateway of the visited network;

wherein the sending module is configured to: after determining according to the IP-CAN session establishment instruction message that a policy decision is made for an IP-CAN session of the roaming user through visited network subscription, send to the V-SPR a subscription update event notification;

wherein the processing module is further configured to: receive latest visited network subscription information of the roaming user transmitted by the V-SPR; and, when finding that it is needed to update PCC rules during a process of visited network policy re-decision, send latest PCC rules to the gateway of the visited network.

6. The V-PCRF according to claim 5, wherein, the processing module is configured to determine according to an access point name of a packet data network identifier contained in the IP-CAN session establishment instruction message that a policy decision is made for an IP-CAN session of the roaming user through visited network subscription.

7. The V-PCRF according to claim 5, wherein, the processing module is configured to send to the V-SPR a subscription data request, and receive the visited network subscription information obtained by the V-SPR according to the subscription data request.

8. The V-PCRF according to claim 5, wherein, user identification information used by the visited network subscription information of the roaming user stored in the V-SPR is the same with user identification information used by home network subscription information of the roaming user, and the user identification information is assigned by a home network; the user identification information comprises a user identifier and/or a user number, the user identifier comprises an International Mobile Subscriber Identity (IMSI), and the user number comprises Mobile Subscriber International Integrated Services Digital Network number (MSISDN).

* * * * *